United States Patent [19]

Webster et al.

[11] Patent Number: 4,590,971
[45] Date of Patent: May 27, 1986

[54] INSULATED PIPELINE

[75] Inventors: George A. Webster, Aberdeen; Brian J. Wadie, Newton, both of Great Britain

[73] Assignee: Webco Industrial Rubber Limited, Scotland

[21] Appl. No.: 564,162

[22] Filed: Dec. 22, 1983

[30] Foreign Application Priority Data

Dec. 23, 1982 [GB] United Kingdom ............... 8236619
Sep. 6, 1983 [GB] United Kingdom ............... 8323835

[51] Int. Cl.⁴ ............................................. F16L 9/14
[52] U.S. Cl. ..................................... 138/149; 138/172; 138/DIG. 6
[58] Field of Search ................. 138/137, 149, DIG. 6, 138/172, 179, 140

[56] References Cited

U.S. PATENT DOCUMENTS

| | | |
|---|---|---|
| 2,857,931 | 10/1958 | Lawton ............................ 138/149 X |
| 3,563,825 | 2/1971 | Seguro et al. .................... 138/149 X |
| 3,728,187 | 4/1973 | Martin .............................. 138/149 X |
| 3,830,899 | 8/1974 | Piccioli et al. .................... 138/149 X |
| 4,040,165 | 8/1977 | Miessler et al. .................. 138/149 X |
| 4,241,762 | 12/1980 | Link et al. ....................... 138/149 X |
| 4,509,561 | 4/1985 | Litz .................................. 138/149 |

Primary Examiner—James E. Bryant, III
Attorney, Agent, or Firm—Mason, Fenwick & Lawrence

[57] ABSTRACT

An insulated pipeline having spaced sections of heat-insulating material held between a continuous corrosion-resistant coating on the pipe and an outer protective jacket, thereby to provide a flexible composite which renders the pipeline resistant to mechanical and chemical attack while provided heat insulation for the pipeline in a manner which allows the pipeline to flex, for example during laying. The pipeline is preferably in the form of a continuous protective matrix bonded to the pipe and enveloping individual sections of the heat-insulating material.

6 Claims, 2 Drawing Figures

INSULATED PIPELINE

BACKGROUND OF THE INVENTION

This invention relates to an insulated pipeline.

Pipelines for passage of oil or gas require to be insulated to prevent thermal damage to the pipe and the material passing through, and such insulation has hitherto been provided by disposing an insulating jacket, which also acts as a vapour barrier, around the pipe. Problems have arisen with such systems, however, when the insulating jacket has been continuous, since the insulating material has been insufficiently resilient to accommodate deformations in the pipe itself caused for example by low-temperature gases passing through the pipe.

To cope with this it has been proposed in West German Pat. No. 25 18940 to provide insulating material in sections spaced along the pipe, with buffer zones of resilient material between the sections to absorb pipe deformations. The insulating material lies freely on the pipe in two coaxial annular layers, of which only the outer layer is in spaced sections. The thin layer is composed of abutting sections laid end-to-end along the pipe. An outer jacket of protective material extends around the outer circumference of the insulating material.

When a pipeline is to be used in subsea environments, where hydrostatic pressure has to be encountered, for example at depths of more than 15 meters, it is necessary to provide not only heat insulation but also corrosion protection and protection against mechanical damage. In the German Patent the outer jacket provides the protection, but if it is ruptured, for example by mechanical damage, seawater should have to pass only the insulating material in order to gain access to the pipe itself. There is no particular provision for sealing the insulating layers against permeation by water, and the system described is therefore unlikely to be suitable for underwater use.

Hitherto, protection and insulation for subsea pipelines has been provided by steel sheaths having water-resistant bulkheads, but such a system is complex and bulky.

SUMMARY OF THE INVENTION

According to the present invention there is provided an insulated pipeline having a pipe, a continuous coating of corrosion-resistant material around the pipe, heat-insulating material disposed around the corrosion-resistant coating and isolated from the pipe by the corrosion-resistant coating, the heat-insulating material being in sections which are spaced along the pipeline, and a continuous jacket of protective material disposed around the heat-insulating material for protection against mechanical damage.

The pipeline of this invention is a composite which provides unique protection and insulation for the article, and this can be of particular importance and benefit when the pipeline is for underwater use.

The heat-insulating material is preferably rigid, for example a rigid foamed material such as polyvinyl chloride (PVC) foam. This may be of high density for use at depths underwater so as to withstand ambient pressure.

The corrosion-resistant material preferably has a thickness from 4 mm to 10 mm and is preferably flexible, for example elastomeric such as polychloroprene or polyurethane. This allows it to flex during laying of the pipeline, which is especially useful when the pipeline is for subsea use in which case considerable bending of the pipeline can occur. The flexibility prevents the corrosion-resistant coating being damaged.

The insulating material is provided in sections each of which may be isolated from adjacent sections as well as from the ambient environment. The isolation is preferably provided by means of resilient material, which may be the same as the protective material, disposed between the sections. Most preferably the sections are mutually isolated within a continuous matrix of the protective material and the corrosion resistant material. Each section of the insulating material is then sealed within an envelope of surrounding material which can extend from the pipe surface to the periphery of the pipeline, providing considerable protection for the pipe and for the heat-insulating material. When the protective material and corrosion-resistant material are the same the sections of insulating material can be held within a continuous uniform matrix on the pipe.

The protective material and the corrosion-resistant material are preferably also non-foamed, impermeable to water and inert to the environment in which the pipeline is to be used.

The corrosion-resistant material is preferably bonded to the pipe along its length to provide a positive seal against chemical attack to the pipe.

BRIEF DESCRIPTION OF THE DRAWINGS

An embodiment of the present invention will now be described by way of example with reference to the accompanying drawings, in which.

DESCRIPTION OF THE PREFERRED EMBODIMENT

Figure 1:
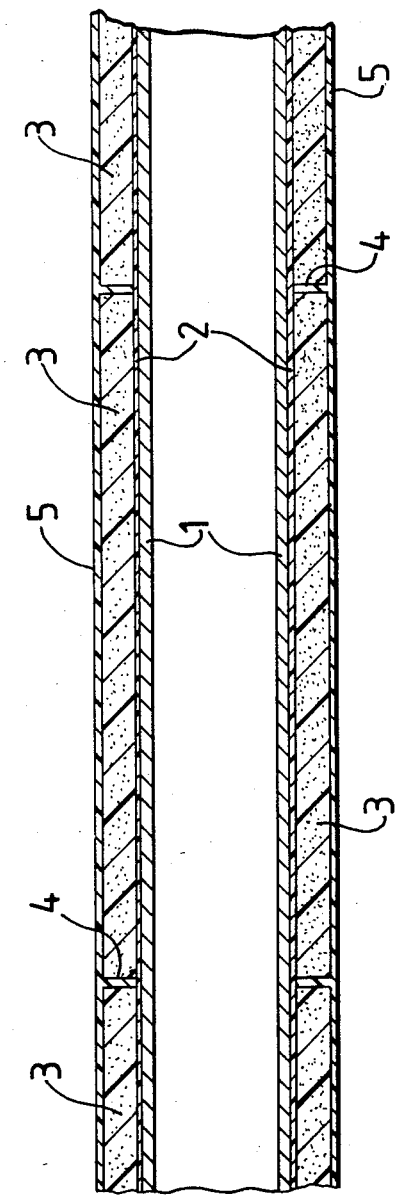
FIG. 1 is a cross-section on a diameter of an underwater insulated pipeline of circular cross-section in accordance with this invention.
Figure 2:
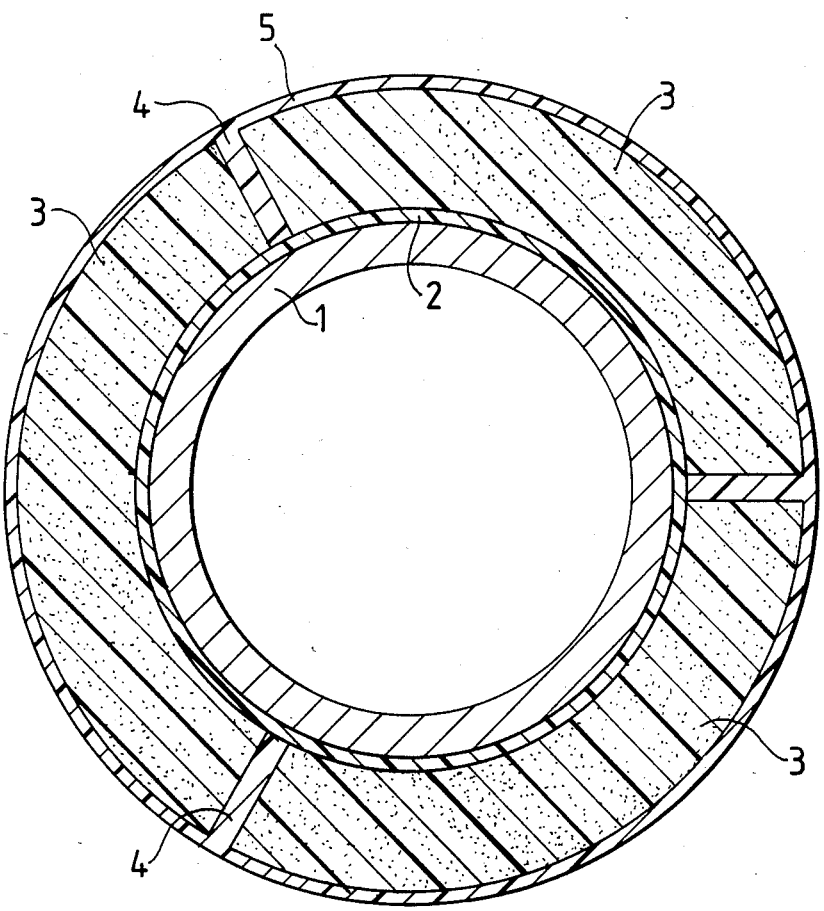
FIG. 2 is a cross-section through the pipeline in a plane at right-angles to that of FIG. 1.

Referring to the drawings, the pipeline of this embodiment of the invention is an oil pipeline for use on the sea bed, for example in the North Sea, having a steel pipe 1 which is 8.625 inches in diameter and 0.625 inches in wall thickness around which extends a corrosion-resistant coating 2 of 6 mm thick polychloroprene rubber. Around the polychloroprene coating 2 are part-cylindrical sections 3 of insulating material in the form of 50 mm thick PVC foam of 200 kg/m³ density. Each section 3 is approximately 1 meter in length and is separated from adjacent sections 3 by a joint filler 4 of polyurethane. An outer abrasion-resistant jacket 5 of 6 mm thick polyurethane extends around the periphery of the insulating sections 3 and fillers 4. The coating 2, filler 4 and jacket 5 form together a continuous matrix enveloping the insulating sections 3, thus isolating the sections 3 from each other and isolating the sections 3 and the pipe 1 from the ambient seawater in use.

The insulating sections 3 are each rigid while the coating 2, filler 4 and jacket 5 are flexible, so that the entire pipeline can flex at the filler-containing joints between the sections 3.

The pipe 1 can have a length of 12,000 meters or more and can be of any external diameter, for example 6 inch, 8 inch or 14 inch. It extends from a wellhead (not shown) at which the oil temperature is about 48 degrees centrigrade, and the oil flowing in the pipe 1 must be kept above 23 degrees centigrade to prevent waxing. The oil flow rate in the pipe 1 is from 6,000 BBPD in 6 inch and 8 inch diameter pipes to 30,000 BBPD in 14 inch pipes.

The polychloroprene of the coating 2 is solid under the Trade Mark LINECOTE by Webco Industrial Rubber Limited and is a flexible elastomer which is vulcanised and bonded to the pipe 1, thus providing a tough coating which is highly chemical and temperature resistant and impervious to moisture and sea water. It is also resistant to abrasion and has high tear and tensile strength, is highly resistant to ozone attack and flex cracking and has low temperature flexibility down to minus 30 degrees centigrade. It is resistant to oils, waxes and gases and most aliphatic hydrocarbons.

The PVC foam forming the sections 3 of insulating material is of closed-cell construction so that any water which contacts the surface of a section 3 cannot penetrate into the section appreciably without rupture of the individual cell walls. Physical properties of the foam used in this embodiment of the invention are given below, but other foams can be used depending on the required properties demanded by the working environment of the pipeline:

| | |
|---|---|
| Compressive strength at 20 degrees centigrade (mpa) | 4.23 |
| Compressive strength at 70 degrees centigrade | 3.61 |
| Compressive Modulus at 20 degrees centigrade (mpa) | 230 |
| Tensile Strength at 20 degrees centigrade (mpa) | 4.4 |
| Flexural Strength at 20 degrees centigrade (mpa) | 6.0 |
| Flexural Modulus at 20 degrees centigrade (mpa) | 120 |
| Water Absorption at 20 degrees centigrade (kg/m$^2$) of cut surface under 3 meter head for 48 hours) | 0.02 |
| Thermal Conductivity (watts/mk) | 0.037 |
| Minimum Operating Temperature degrees centigrade | −200 |
| Maximum Operating Temperature degrees centigrade | 95 |

The outer layer 5 of the pipeline is based on a two-part polyurethane system having high abrasion and cut growth resistance, and excellent resistance to sea water. The physical properties of the material are as follows.

| | |
|---|---|
| Hardness (IRHD) | 84 |
| Tensile strength (psi) min. | 1850 |
| Elongation at Break (%) min. | 350 |
| Tear Resistance (lb/inch) min. | 200 |
| Specific Gravity | 1.13 |
| Taber Abrasion Resistance Loss/1000 cycles (mg) | 100 |
| Compression Set at 70 degrees centigrade | 40 |
| Volume Swell in Sea Water Typical % Change | |

| Temperature | 1 Week | 2 Weeks | 3 Weeks |
|---|---|---|---|
| 4 degrees centigrade | 5.16 | 6.10 | 6.44 |
| 38 degrees centigrade | 3.19 | 3.50 | 3.08 |
| 70 degrees centigrade | 3.74 | 3.74 | 3.32 |

To manufacture the insulated pipeline of this embodiment of the invention the LINECOTE polychloroprene coating 2 is first rotationally extruded onto the fully prepared outer surface of the steel pipe 1. This surface preparation consists of shotblasting to a minimum SA 2.5 and applying a primer under controlled temperature and humidity conditions. After vulcanising the polychloroprene rubber in a steam autoclave at 153 degrees centigrade and 60 psi a 100% rubber tear bond is obtained (i.e. the strength of the chemical bond is greater than the tensile and tear strength of the rubber).

The PVC foam is premoulded into 1 meter sections 3 and applied to the rubber-coated pipe 1 by adhesive, using a tension strapping machine set at 1200 N tension to ensure good contact between the foam and the rubber coating 2. The sections 3 are applied with the joints 4 at 12 mm wide.

The polyurethane abrasion-resistant layer 5 is applied by means of a two-part polyurethane mixing machine to form a continuous layer in full contact with the PVC foam sections and penetrating the joints 4 to form a closed envelope round each individual section 3. This has the effect of limiting any severe physical damage which may result in penetration of the polyurethane coating.

The longitudinal and radial joints 4 of the foam when filled with the polyurethane act as compression and tension buffers during bending of the pipeline, for example when reel laying the pipeline.

When combined to form the pipeline of this embodiment of the invention the bonds between the component parts have the following shear strengths:

| | shear strength mm/m$^2$ |
|---|---|
| polyurethane - rubber | 0.8 |
| Polyurethane - PVC foam | 0.8 |
| Rubber - PVC foam | 0.9 |
| Rubber - steel pipe | >0.9 |

Peel strength urethane to 360 kg/m$^3$ foam.

The combination of a sectional rigid insulating material with a flexible matrix allows the pipeline of this embodiment to be laid by a variety of methods, for example by reel barge, "J-lay", lay barge and mid-depth tow.

The construction technique also provides a high degree of safety since each section 3 of insulating material is isolated and held within the flexible elastomeric matrix.

An advantage of the pipeline of this embodiment of the invention is that the insulation is held tightly against the pipe thereby preventing slippage along the pipe; this is especially important during laying due to the high tension created in the pipeline as it passes from a laying barge to the seabed.

In modification, the layer 5 can be reinforced to create even greater resistance to physical damage, and in extreme cases concrete or other rigid cladding can be applied around the pipeline, providing also additional weight to hold it in position on the sea bed.

A further modification utilises the same insulation material at joints between insulation sections 3, giving the same thermal properties over a jointing area. This ensures that there is no increased heat loss at the joint position, and allows a smooth uniform temperature distribution along the pipe length.

The basic technique comprises abrading the welded area with a wire brush, removing any loose particles, and roughening any exposed urethane or rubber surface; assembling pre-cut foam sections, and tensioning them into position using steel bandit, all surfaces having been primed; locating a collar mould and injecting polyurethane into the collar mould, and, after gelling, removing the mould and trimming back the flash area.

The total time for this operation is typically 10 to 15 minutes.

Various considerations apply in selecting the best materials to be used in the invention; principally flexibility, toughness, anti-corrosion capabilities, adhesion to steel and to other parts of the pipeline, water resistance, temperature resistance, tensile strength, insulation properties, hydraulic strength and compressive and hydraulic creep resistance.

Such properties may be altered depending on the working environment and the method of laying the pipeline, for example the strain induced in the foam during reeling can be reduced by use of a compliant encapsulating matrix, due to the ratio of Young's moduli of the component materials and lengths of individual sections. The pipeline should be capable of transmitting the stress from the reel tensioning devices through the insulating system to the pipe without damage to any of the system components.

We claim:

1. An insulated pipeline having
   a pipe,
   a continuous coating of non-foamed resilient water-impermeable corrosion-resistant material around the pipe,
   heat-insulating material disposed around the corrosion-resistant coating and isolated from the pipe by the corrosion-resistant coating, the heat-insulating material being in sections which are mutually spaced along the pipeline, and
   a continuous abrasion-resistant jacket of protective non-foamed resilient water-impermeable material disposed around the heat-insulating material for protection against mechanical damage,
   the corrosion-resistant coating and the protective jacket being bonded together by non-foamed water-impermeable resilient material extending between the sections of heat-insulating material so that the corrosion-resistant coating, the protective jacket and the resilient material together form a continuous non-foamed matrix which encloses and surrounds the sections of heat insulating material thereby to enclose and isolate each section of heat-insulating material from adjacent sections of heat-insulating material.

2. An insulated pipeline according to claim 1, wherein the resilient material between the sections of the heat-insulating material is the same as the protective material.

3. An insulated pipeline according to claim 1, wherein the corrosion-resistant coating is bonded along its length to the pipe.

4. An insulated pipeline according to claim 1, wherein both the corrosion-resistant material and the protective material are elastomeric.

5. An insulated pipeline according to claim 1, wherein the corrosion-resistant coating has a thickness in the range from 4 mm to 10 mm.

6. An insulated pipeline according to claim 1, wherein the sections of the heat-insulating material are each part-cylindrical and the circumference of the pipe is surrounded by a plurality of said sections mutually angularly spaced and separated by said resilient material.

* * * * *